United States Patent
Aidun

(10) Patent No.: US 12,270,746 B2
(45) Date of Patent: Apr. 8, 2025

(54) FLUIDIC-BASED REGULATION, PLUG REMOVAL, AND MULTIPLEXING METHODS AND DEVICES FOR PROCESSING OF PARTICLES SUSPENDED IN LIQUID

(71) Applicant: BIOAUTOMATON SYSTEMS INC., Marietta, GA (US)

(72) Inventor: Cyrus K. Aidun, Marietta, GA (US)

(73) Assignee: BIOAUTOMATON SYSTEMS INC., Marietta, GA (US)

( * ) Notice: Subject to any disclaimer, the term of this patent is extended or adjusted under 35 U.S.C. 154(b) by 261 days.

(21) Appl. No.: 17/916,666

(22) PCT Filed: Mar. 31, 2021

(86) PCT No.: PCT/US2021/025085
§ 371 (c)(1),
(2) Date: Oct. 3, 2022

(87) PCT Pub. No.: WO2021/202662
PCT Pub. Date: Oct. 7, 2021

(65) Prior Publication Data
US 2023/0168169 A1    Jun. 1, 2023

Related U.S. Application Data

(60) Provisional application No. 63/003,983, filed on Apr. 2, 2020.

(51) Int. Cl.
*G01N 15/06* (2024.01)
*G01N 15/14* (2024.01)
(Continued)

(52) U.S. Cl.
CPC .......... *G01N 15/06* (2013.01); *G01N 15/1433* (2024.01); *G01N 15/075* (2024.01); *G01N 2015/1027* (2024.01)

(58) Field of Classification Search
CPC .. G01N 15/06; G01N 15/1433; G01N 15/075; G01N 2015/1027
See application file for complete search history.

(56) References Cited

U.S. PATENT DOCUMENTS 3,719,090 A  3/1973  Hathaway
4,432,674 A  2/1984  Klose et al.
(Continued)

FOREIGN PATENT DOCUMENTS

WO    2009126758 A1    10/2009

OTHER PUBLICATIONS

Extended European Search Report received in connection with European Application No. 21782291.5, dated Mar. 13, 2024, 9 pages.
(Continued)

*Primary Examiner* — Jamil Ahmed
(74) *Attorney, Agent, or Firm* — Meunier Carlin & Curfman LLC

(57) ABSTRACT

Methods and devices for fluidic-based automated regulation of liquid-suspended particles and plug removal (of particles) from possible choke points in the liquid flow channel and methods for multiple parallel particle processing are disclosed. The apparatus comprises flow channels, flow direction means, particle detectors and a control unit.

12 Claims, 4 Drawing Sheets

(51) Int. Cl.
*G01N 15/1433* (2024.01)
*G01N 15/075* (2024.01)
*G01N 15/10* (2006.01)

(56) References Cited

U.S. PATENT DOCUMENTS

| | | |
|---|---|---|
| 6,211,956 B1 | 4/2001 | Nicoli |
| 6,751,525 B1 | 6/2004 | Crisp, III |
| 10,343,165 B2 | 7/2019 | Sadri et al. |
| 2011/0153093 A1* | 6/2011 | Aidun .................. A01H 4/00 700/282 |
| 2012/0202289 A1 | 8/2012 | Aidun |
| 2018/0171289 A1 | 6/2018 | Adams et al. |

OTHER PUBLICATIONS

Aidun et al. "Forming jet surface velocity profile measurements with high speed digital imaging." Tappi journal 84.3 (2001).
International search report and written opinion in PCT/US2021/025085. Mailed Jun. 29, 2021. 14 pages.

* cited by examiner

FLUIDIC-BASED REGULATION, PLUG REMOVAL, AND MULTIPLEXING METHODS AND DEVICES FOR PROCESSING OF PARTICLES SUSPENDED IN LIQUID

CROSS-REFERENCE TO RELATED APPLICATIONS

This application is a national stage application filed under 35 U.S.C. § 371 of PCT/US2021/025085 filed Mar. 31, 2021, which claims the benefit of U.S. Provisional Patent Application No. 63/003,983, filed Apr. 2, 2020, the contents of which are incorporated herein by reference in their entirety.

BACKGROUND

For many processes or devices that manipulate liquid-suspended particles, it is necessary to feed the particles in a regulated manner to increase efficiency and reduce any malfunction of the equipment. For instance, if a device is using image processing techniques to sort (select objects with specific features and reject others) travelling in a liquid conduit, the task of the image recognition and analysis becomes more difficult and tedious if the image contains more objects travelling closer to each other. Furthermore, the task of image processing will be more time consuming with adverse impact on the processing rates.

Thus, there is a need for methods and an effective device to control and regulate the particles from a high concentration flow into a separate flow stream with individual particles in a sequential and efficient manner Having only individual particles with sufficient distance to neighboring particles in a flow stream would facilitate further processing in the downstream processes or devices.

Furthermore, the particles traveling in the liquid flow channels may get jammed due to change of path and size of the flow channel. These jammed particles (plugs) need to be removed from the flow channel as quickly as possible to reduce any damage and downtime for the equipment.

Thus, there is a need for methods and an effective device for removing plugs from flow channels.

SUMMARY

Various implementations include a regulating device for automatically regulating particles suspended in a liquid. The regulating device includes an inlet tube, a reservoir tube, an outlet tube, at least one sensor, and a valve. The inlet tube has a first inlet tube end and a second inlet tube end opposite and spaced apart from the first inlet tube end. The reservoir tube has a first reservoir tube end and a second reservoir tube end opposite and spaced apart from the first reservoir tube end. The second reservoir tube end is coupled to and in fluid communication with the second inlet tube end. The outlet tube has a first outlet tube end and a second outlet tube end opposite and spaced apart from the first outlet tube end. The first outlet tube end is coupled to and in fluid communication with the second inlet tube end and the second reservoir tube end. The at least one sensor is for detecting particles suspended in the liquid. A first sensor is configured to detect particles within a portion of the reservoir tube. The valve is configured to regulate the flow of liquid through the inlet tube.

In some implementations, the first sensor includes an optical imager.

In some implementations, the at least one sensor further includes a second sensor configured to detect particles within a portion of the outlet tube. In some implementations, the second sensor includes a laser-based optical sensor.

In some implementations, the valve comprises a variable-flow pinch valve.

In some implementations, the regulating device further includes a controller. The controller is in operable communication with the first sensor and the valve. The controller executes computer-readable instructions that cause the controller to receive first sensor data from the first sensor. The first sensor data corresponds to the concentration and velocity of particles within a portion of the reservoir tube. The instructions also cause the controller to compare the first sensor data to a maximum value. The maximum value is predetermined to provide a desired local concentration and velocity of particles within the portion of the reservoir tube. The instructions also cause the controller to either cause the valve to open in response to the first sensor data being greater than the maximum value or cause the valve to close in response to the first sensor data being less than the maximum value.

In some implementations, the controller is in operable communication with the second sensor and the valve. The controller executes computer-readable instructions that cause the controller to receive second sensor data from the second sensor. The second sensor data corresponds to the detection of particles within a portion of the outlet tube. The instructions also cause the controller to calculate a time interval between particle detected by the second sensor and compare the time interval to a predefined minimum time interval. The predefined minimum time interval is predetermined to provide a separation between particles within the portion of the outlet tube. The instructions also cause the controller to cause the valve to open in response to the time interval being less than the predefined minimum time interval.

Various other implementations include a plug removal device for automatically removing plugs in a liquid. The plug removal device includes an inlet tube, an outlet tube, a particle processing tube, at least one sensor, a first valve, and a second valve. The inlet tube has a first inlet tube end and a second inlet tube end opposite and spaced apart from the first inlet tube end. The outlet tube has a first outlet tube end and a second outlet tube end opposite and spaced apart from the first outlet tube end. The second outlet tube end is coupled to and in fluid communication with the second inlet tube end. The particle processing tube has a first particle processing tube end and a second particle processing tube end opposite and spaced apart from the first particle processing tube end. The first particle processing tube end is coupled to and in fluid communication with the second inlet tube end and the second outlet tube end. The at least one sensor is for detecting particles suspended in the liquid. A first sensor is configured to detect particles within a portion of the particle processing tube. The first valve is configured to regulate the flow of liquid through the inlet tube. The second valve is configured to regulate the flow of liquid through the outlet tube.

In some implementations, the first sensor includes a photo sensor.

In some implementations, the at least one sensor further includes a second sensor and a third sensor. The second sensor is configured to detect particles within a first portion of the particle processing tube, and the third sensor is configured to detect particles within a second portion of the particle processing tube. The second portion is downstream of the first portion. In some implementations, the second sensor and third sensor comprise laser-based optical sensors.

In some implementations, the first valve and the second valve comprise solenoid pinch valves.

In some implementations, the plug removal device further includes a controller. The controller is in operable communication with the first sensor, the first valve, and the second valve. The controller executes computer-readable instructions that cause the controller to receive first sensor data from the first sensor. The first sensor data corresponds to the detection of one or more plugs within a portion of the particle processing tube. The instructions also cause the controller to cause the first valve to close and the second valve to open in response to the first sensor data indicating the detection of one or more plugs within a portion of the particle processing tube.

In some implementations, the controller is in operable communication with the second sensor, the third sensor, the first valve, and the second valve. The controller executes computer-readable instructions that cause the controller to receive second sensor data from the second sensor and third sensor data from the third sensor. The second sensor data corresponds to the detection of one or more particles flowing through a portion of the inlet tube, and the third sensor data corresponds to the detection of one or more particles flowing through a portion of the particle processing tube. The instructions also cause the controller to calculate an expected time interval between detection of a particle by the second sensor and detection of the particle by the third sensor based on the velocity of the particle and to compare an actual time interval between the detection of the particle by the second sensor and detection of the particle by the third sensor to the expected time interval. The instructions also cause the controller to cause the first valve to close and the second valve to open in response to the actual time interval being greater than the expected time interval.

Various other implementations include a system for automatically regulating particles suspended in a liquid. The system includes at least one regulating device, a reservoir tank, and a high pressure water source. The reservoir tank has a first end and a second end opposite and spaced apart from the first end. The first end is in fluid communication with atmospheric pressure, and the second end of the reservoir tank is in fluid communication with the first reservoir tube end. The high pressure water source is in fluid communication with the first inlet tube end.

In some implementations, the system further includes a particle receiving chamber in fluid communication with the second outlet tube end. The particle receiving chamber defines a liquid overflow outlet configured to maintain a predetermined liquid pressure head within the particle receiving chamber.

In some implementations, the at least one regulating device includes two or more regulating devices. The second end of the reservoir tank is in fluid communication with the first reservoir tube end of each of the two or more regulating devices. In some implementations, each of the two or more regulating devices operates independently of the other regulating devices.

In some implementations, the at least one regulating device includes a first regulating device. The system further includes at least one second regulating device and a second reservoir tank. The first end of the second reservoir tank is in fluid communication with the first reservoir tube end of the second regulating device.

In some implementations, the system further includes a mixer disposed within the reservoir tank. The mixer is rotatable to mix liquid disposed within the reservoir tank.

In some implementations, the first sensor includes an optical imager.

In some implementations, the at least one sensor further includes a second sensor configured to detect particles within a portion of the outlet tube. In some implementations, the second sensor includes a laser-based optical sensor.

In some implementations, the valve comprises a variable-flow pinch valve.

In some implementations, the system further includes a controller. The controller is in operable communication with the first sensor and the valve. The controller executes computer-readable instructions that cause the controller to receive first sensor data from the first sensor. The first sensor data corresponds to the concentration and velocity of particles within a portion of the reservoir tube. The instructions also cause the controller to compare the first sensor data to a maximum value. The maximum value is predetermined to provide a desired local concentration and velocity of particles within the portion of the reservoir tube. The instructions also cause the controller to either cause the valve to open in response to the first sensor data being greater than the maximum value or cause the valve to close in response to the first sensor data being less than the maximum value.

In some implementations, the controller is in operable communication with the second sensor and the valve. The controller executes computer-readable instructions that cause the controller to receive second sensor data from the second sensor. The second sensor data corresponds to the detection of particles within a portion of the outlet tube. The instructions also cause the controller to calculate a time interval between particle detected by the second sensor and compare the time interval to a predefined minimum time interval. The predefined minimum time interval is predetermined to provide a separation between particles within the portion of the outlet tube. The instructions also cause the controller to cause the valve to open in response to the time interval being less than the predefined minimum time interval.

In some implementations, the system further includes a plug removal device.

In some implementations, the at least one plug removal device includes two or more plug removal devices. The inlet tube of each of the two or more plug removal devices is in fluidic communication with the particle receiving chamber. In some implementations, each of the two or more plug removal devices operates independently of the other plug removal devices.

In some implementations, the first outlet tube end is in fluid communication with a vacuum source.

In some implementations, the first valve and the second valve of the plug removal device comprise solenoid pinch valves.

In some implementations, the controller is in operable communication with the first sensor, the first valve, and the second valve. The controller executes computer-readable instructions that cause the controller to receive first sensor data from the first sensor. The first sensor data corresponds to the detection of one or more plugs within a portion of the particle processing tube. The instructions also cause the controller to cause the first valve to close and the second valve to open in response to the first sensor data indicating the detection of one or more plugs within a portion of the particle processing tube.

In some implementations, the at least one sensor further includes a second sensor and a third sensor. The second sensor is configured to detect particles within a first portion of the particle processing tube, and the third sensor is configured to detect particles within a second portion of the particle processing tube. The second portion is downstream of the first portion. In some implementations, the second sensor and third sensor comprise laser-based optical sensors.

In some implementations, the controller is in operable communication with the second sensor, the third sensor, the first valve, and the second valve. The controller executes computer-readable instructions that cause the controller to receive second sensor data from the second sensor and third sensor data from the third sensor. The second sensor data corresponds to the detection of one or more particles flowing through a portion of the inlet tube, and the third sensor data corresponds to the detection of one or more particles flowing through a portion of the particle processing tube. The instructions also cause the controller to calculate an expected time interval between detection of a particle by the second sensor and detection of the particle by the third sensor based on the velocity of the particle and to compare an actual time interval between the detection of the particle by the second sensor and detection of the particle by the third sensor to the expected time interval. The instructions also cause the controller to cause the first valve to close and the second valve to open in response to the actual time interval being greater than the expected time interval.

Various other implementations include a method for automatically regulating particles suspended in a liquid. The method includes providing at least one regulating device; providing a reservoir tank having a first end and a second end opposite and spaced apart from the first end, wherein the first end is in fluid communication with atmospheric pressure and the second end of the reservoir tank is in fluid communication with the first reservoir tube end; providing a high pressure water source in fluid communication with the first inlet tube end; receiving first sensor data from the first sensor, wherein the first sensor data corresponds to the concentration and velocity of particles within a portion of the reservoir tube; comparing the first sensor data to a maximum value, wherein the maximum value is predetermined to provide a desired local concentration and velocity of particles within the portion of the reservoir tube; and either causing the valve to open in response to the first sensor data being greater than the maximum value or causing the valve to close in response to the first sensor data being less than the maximum value.

In some implementations, the at least one regulating device includes two or more regulating devices. The second end of the reservoir tank is in fluid communication with the first reservoir tube end of each of the two or more regulating devices. In some implementations, each of the two or more regulating devices operates independently of the other regulating devices.

In some implementations, the at least one regulating device includes a first regulating device. The system further includes at least one second regulating device and a second reservoir tank. The first end of the second reservoir tank is in fluid communication with the first reservoir tube end of the second regulating device.

In some implementations, the first sensor includes an optical imager.

In some implementations, the at least one sensor further includes a second sensor configured to detect particles within a portion of the outlet tube. In some implementations, the second sensor includes a laser-based optical sensor.

In some implementations, the valve comprises a variable-flow pinch valve.

In some implementations, the method further includes receiving second sensor data from the second sensor. The second sensor data corresponds to the detection of particles within a portion of the outlet tube. The method further includes calculating a time interval between particle detected by the second sensor and compare the time interval to a predefined minimum time interval. The predefined minimum time interval is predetermined to provide a separation between particles within the portion of the outlet tube. The method further includes causing the valve to open in response to the time interval being less than the predefined minimum time interval.

In some implementations, the method further includes providing a plug removal device.

In some implementations, the first outlet tube end is in fluid communication with a vacuum source.

In some implementations, the first sensor of the plug removal device comprises a photo sensor.

In some implementations, the first valve and the second valve of the plug removal device comprise solenoid pinch valves.

In some implementations, the method further includes receiving first sensor data from the first sensor. The first sensor data corresponds to the detection of one or more plugs within a portion of the particle processing tube. The method further includes causing the first valve to close and the second valve to open in response to the first sensor data indicating the detection of one or more plugs within a portion of the particle processing tube.

In some implementations, the at least one sensor further includes a second sensor and a third sensor. The second sensor is configured to detect particles within a first portion of the particle processing tube, and the third sensor is configured to detect particles within a second portion of the particle processing tube. The second portion is downstream of the first portion. In some implementations, the second sensor and third sensor comprise laser-based optical sensors.

In some implementations, the method further includes receiving second sensor data from the second sensor and third sensor data from the third sensor. The second sensor data corresponds to the detection of one or more particles flowing through a portion of the inlet tube, and the third sensor data corresponds to the detection of one or more particles flowing through a portion of the particle processing tube. The method further includes calculating an expected time interval between detection of a particle by the second sensor and detection of the particle by the third sensor based on the velocity of the particle and to compare an actual time interval between the detection of the particle by the second sensor and detection of the particle by the third sensor to the expected time interval. The method further includes causing the first valve to close and the second valve to open in response to the actual time interval being greater than the expected time interval.

Various other implementations include a method for automatically removing plugs in a liquid. The method includes providing at least one plug removal device; receiving first sensor data from the first sensor of the plug removal device, wherein the first sensor data corresponds to the detection of one or more plugs within a portion of the particle processing tube; and causing the first valve of the plug removal device to close and the second valve of the plug removal device to open in response to the first sensor data indicating the detection of one or more plugs within a portion of the particle processing tube.

In some implementations, the first outlet tube end is in fluid communication with a vacuum source.

In some implementations, the first sensor of the plug removal device comprises a photo sensor.

In some implementations, the first valve and the second valve of the plug removal device comprise solenoid pinch valves.

In some implementations, the at least one sensor further includes a second sensor and a third sensor. The second sensor is configured to detect particles within a first portion of the particle processing tube, and the third sensor is configured to detect particles within a second portion of the particle processing tube. The second portion is downstream of the first portion. In some implementations, the second sensor and third sensor comprise laser-based optical sensors.

In some implementations, the method further includes receiving second sensor data from the second sensor and third sensor data from the third sensor. The second sensor data corresponds to the detection of one or more particles flowing through a portion of the inlet tube, and the third sensor data corresponds to the detection of one or more particles flowing through a portion of the particle processing tube. The method further includes calculating an expected time interval between detection of a particle by the second sensor and detection of the particle by the third sensor based on the velocity of the particle and to compare an actual time interval between the detection of the particle by the second sensor and detection of the particle by the third sensor to the expected time interval. The method further includes causing the first valve to close and the second valve to open in response to the actual time interval being greater than the expected time interval.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Various implementations of the devices, systems, and methods described herein include a regulating device that provides an automated means for gently separating particles from each other and guiding the particles into a separate stream of liquid in a rapid and efficient manner Various implementations of the devices, systems, and methods described herein also or separately include a plug removal device that automatically removes plugs occurring in the liquid flow channels. Furthermore, to increase the rate of production and system capacity, a multiplexing method and device comprising multiple line regulation systems are disclosed.

Figure 3A:
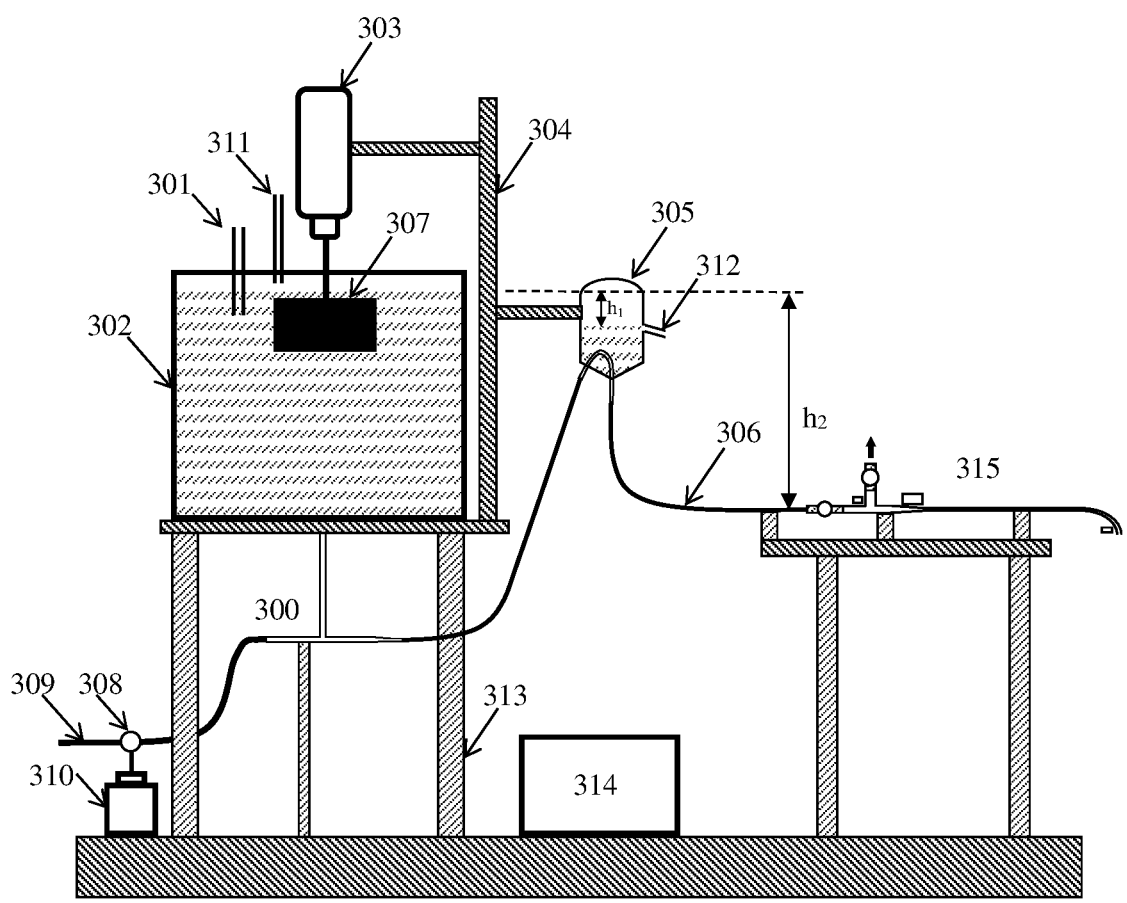
FIG. 3A is a side view of a system, according to one implementation, including the regulating device of FIG. 1 and the plug removal device of FIG. 2.
Figure 3B:
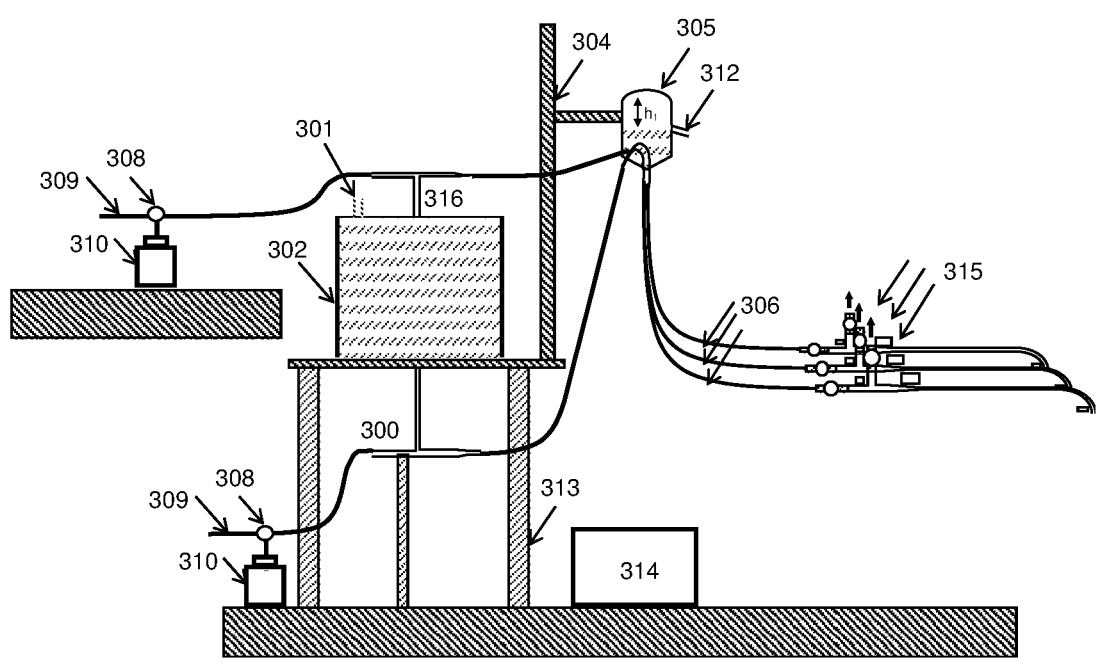
FIG. 3B is a side view of a system, according to another implementation, including two of the regulating devices of FIG. 1 and three of the plug removal devices of FIG. 2.

The devices, systems, and methods disclosed herein can be used independently in a fluidics system or can be integrated with existing flow systems. For example, the inventions disclosed herein can be implementation in conjunction with a new and novel reservoir tank design, as shown in FIG. 3B, or added to a significantly modified version of a reservoir tank 302, as shown in FIG. 3A, disclosed in patent US2012/0202289 A1: Separator Device, Deposition Device and System for Handling of Somatic Plant Embryos. In this patent, there are no automated regulation mechanisms to effectively regulate the embryos coming out of the Separator Device. Therefore, the device presented herein is designed to regulate the embryos coming out of the Separator Device and send individual embryos (spaced out properly) to the Deposition Device. It is very important to space out the embryos and control the feed rate for the Deposition Device to improve the overall efficiency of the whole system.

Reservoir tank 302 in FIG. 3B has no moving parts and can accommodate particles that are heavier than the suspending fluid or lighter than the suspending fluid or a mixture of particles some heavier and some lighter than the suspending fluid.

The automated plug removal method and device can be used independently or implemented to remove any particles that get jammed in the liquid flow channels.

This invention provides an effective mechanism to automatically regulate the particles (control the spacing between adjacent particles) travelling in a liquid flow channel or multiple flow channels. This is a way of manipulating liquid-suspended particles, which are travelling in a liquid flow channel in a sequential manner, to perform separation of particles with an adequate distance so the particles do not get too close to each other. Also, another mechanism to automatically remove particles getting jammed in the liquid flow channels is disclosed. These two mechanisms would increase the efficiency and reduce any malfunction or downtime for downstream processes or devices. Furthermore, there would be continuous and seamless operation of the downstream processes or devices in single or multiple lines.

Figure 1:
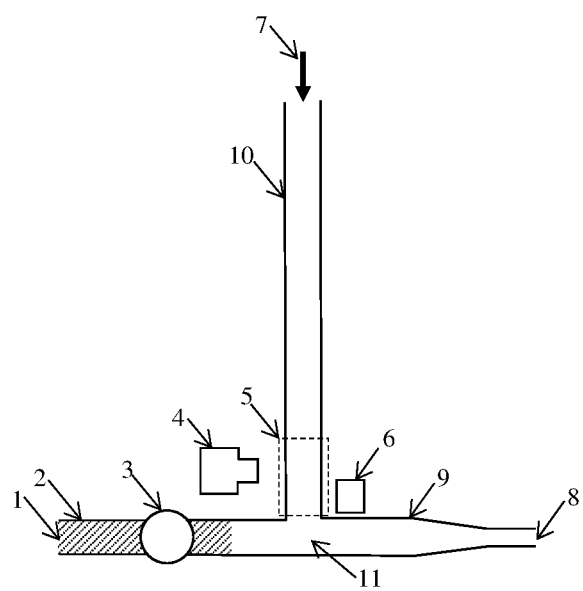
FIG. 1 is a side view of a regulating device, according to one implementation.

The regulator device of the invention preferably includes a vertical and a horizontal glass tubes fused together as shown in FIG. 1 which are filled with a fluid medium. The fluid medium has a density that is lower than that of the particles being regulated. The fluid medium may preferably be water. The direction of the liquid flow in the vertical conduit 10 is controlled by varying the pressure using a variable flow pinch valve 3.

Figure 2:
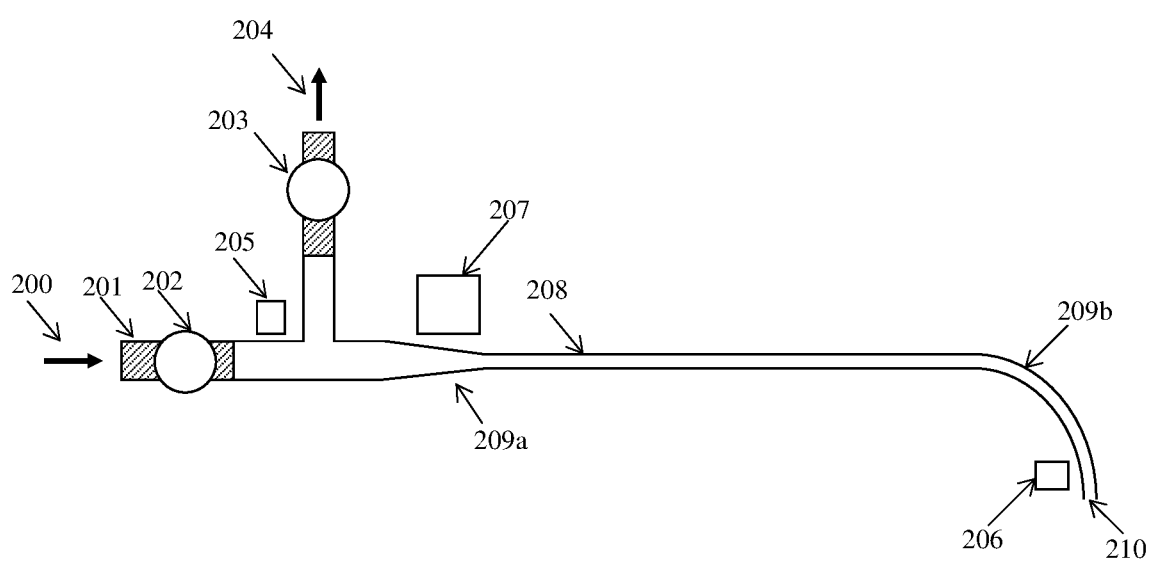
FIG. 2 is a side view of a plug removal device, according to one implementation.

The plug removal device of the invention mainly consists of a suction tube and solenoid valves as shown in FIG. 2 which is connected to the main flow conduit. The outlet suction line 204 is closed during normal operation, but automatically gets opened to remove any clogged particles in the flow channel.

The entire regulator and plug removal can be arranged in single (FIG. 3A) or multiple parallel lines (FIG. 3B) to increase capacity and production rate.

For purposes herein, the term particle is defined as a plant embryo or a propagule or any biological or nonbiological object which is suspended in a liquid. The terms tube, channel, conduit and flow channel are used interchangeably. The terms are used without specific reference to any particular geometric shape of the cross-section, unless specifically stated otherwise. Without loss of generality, all references to fluid or liquid discussed herein can be applied to any fluid including any liquid or gas.

Various implementations include a regulating device for automatically regulating particles suspended in a liquid. The regulating device includes an inlet tube, a reservoir tube, an outlet tube, at least one sensor, and a valve. The inlet tube has a first inlet tube end and a second inlet tube end opposite and spaced apart from the first inlet tube end. The reservoir tube has a first reservoir tube end and a second reservoir tube end opposite and spaced apart from the first reservoir tube end. The second reservoir tube end is coupled to and in fluid communication with the second inlet tube end. The outlet tube has a first outlet tube end and a second outlet tube end opposite and spaced apart from the first outlet tube end. The first outlet tube end is coupled to and in fluid communication with the second inlet tube end and the second reservoir tube end. The at least one sensor is for detecting particles suspended in the liquid. A first sensor is configured to detect particles within a portion of the reservoir tube. The valve is configured to regulate the flow of liquid through the inlet tube.

Various other implementations include a plug removal device for automatically removing plugs in a liquid. The plug removal device includes an inlet tube, an outlet tube, a particle processing tube, at least one sensor, a first valve, and a second valve. The inlet tube has a first inlet tube end and a second inlet tube end opposite and spaced apart from the first inlet tube end. The outlet tube has a first outlet tube end and a second outlet tube end opposite and spaced apart from the first outlet tube end. The second outlet tube end is coupled to and in fluid communication with the second inlet tube end. The particle processing tube has a first particle processing tube end and a second particle processing tube end opposite and spaced apart from the first particle processing tube end. The first particle processing tube end is coupled to and in fluid communication with the second inlet tube end and the second outlet tube end. The at least one sensor is for detecting particles suspended in the liquid. A first sensor is configured to detect particles within a portion of the particle processing tube. The first valve is configured to regulate the flow of liquid through the inlet tube. The second valve is configured to regulate the flow of liquid through the outlet tube.

Various other implementations include a system for automatically regulating particles suspended in a liquid. The system includes at least one regulating device, a reservoir tank, and a high pressure water source. The reservoir tank has a first end and a second end opposite and spaced apart from the first end. The first end is in fluid communication with atmospheric pressure, and the second end of the reservoir tank is in fluid communication with the first reservoir tube end. The high pressure water source is in fluid communication with the first inlet tube end.

Various other implementations include a method for automatically regulating particles suspended in a liquid. The method includes providing at least one regulating device; providing a reservoir tank having a first end and a second end opposite and spaced apart from the first end, wherein the first end is in fluid communication with atmospheric pressure and the second end of the reservoir tank is in fluid communication with the first reservoir tube end; providing a high pressure water source in fluid communication with the first inlet tube end; receiving first sensor data from the first sensor, wherein the first sensor data corresponds to the concentration and velocity of particles within a portion of the reservoir tube; comparing the first sensor data to a maximum value, wherein the maximum value is predetermined to provide a desired local concentration and velocity of particles within the portion of the reservoir tube; and either causing the valve to open in response to the first sensor data being greater than the maximum value or causing the valve to close in response to the first sensor data being less than the maximum value.

Various other implementations include a method for automatically removing plugs in a liquid. The method includes providing at least one plug removal device; receiving first sensor data from the first sensor of the plug removal device, wherein the first sensor data corresponds to the detection of one or more plugs within a portion of the particle processing tube; and causing the first valve of the plug removal device to close and the second valve of the plug removal device to open in response to the first sensor data indicating the detection of one or more plugs within a portion of the particle processing tube.

The overall construction of the regulator apparatus is presented in FIG. 1. The apparatus comprises flow channels for the liquid comprising liquid inlet 1 of an inlet tube 2 connected to a variable-flow pinch valve 3, liquid outlet 8 of an outlet tube 9 and reservoir tube 10 connected to a reservoir tank. All the tubes are connected at an intersection 11. The intersection 11 is preferably planar and the tubes 9 and 10 meet preferably at a 90° angle. It is important to keep the reservoir tube 10 substantially parallel to the vertical axis since the particles with density higher than the liquid density need to be able to travel down in flow direction 7 in the reservoir tube 10 due to gravity. In this case, the direction of gravity is the same as the flow direction 7. If the particle is less dense than the liquid, it is feasible to reverse the orientation of the apparatus in FIG. 1 so that the particle flows upward instead of the downward direction. In this case, the flow direction 7 is opposite to the direction of gravity. Furthermore, if the sample consists of inhomogeneous particles with the density of some particles greater than liquid and some particles with density lower than liquid, it is feasible to have two apparatus of FIG. 1, one with flow direction 7 parallel to the direction of gravity and one in the opposite orientation with flow direction 7 opposite to the direction of gravity. Without loss of generality, in the following description of the invention and examples, it is assumed that the particle is denser than liquid. However, by proper orientation of the apparatus or having two apparatus on top and bottom of the reservoir tank 302 in a mirror image symmetric manner the invention can be applied to the case where the particles are less dense than liquid or an inhomogeneous collection of particles where some are denser and some less dense than the liquid.

Preferably, the flow channels have an essentially circular cross-section, although other geometries can be used as long as the particles are not damaged during their passage through the flow channels. Also, preferably, the flow channels are smooth on the inside. Any roughness on the inner surfaces may damage the particles and create resistance on the particles traveling at the boundary walls of the flow channels. The flow channels are dimensioned such that the particles (suspended in the liquid) may travel in the liquid flow without substantial resistance. Preferably, the reservoir tube 10 comprises two sections: the top half comprises a circular cross-section glass tube and the bottom half comprises of a rectangular cross-section glass tube. There are mainly two reasons for having the reservoir tube 10 have a rectangular cross-section: (1) easier to disperse the particles in the vertical plane, especially in the scan region 5; and (2) minimize bright reflection spots and lensing effect created by the camera flash.

The apparatus comprises flow direction means 7 (see FIG. 1) having means of: (1) directing the flow from the reservoir tank 302 to 11 and outlet 8; and (2) directing the flow from the intersection 11 towards the reservoir tank 302. The flow direction shown by 7 can be positive or negative depending on the hydrostatic and dynamic pressure acting at the intersection 11.

Any means of controllably regulating and/or directing liquid flow that do not subject the particles to damaging amounts of stress may potentially be used as flow direction means. The direction means may comprise an inlet valve 3 placed in the inlet tube 2, wherein said valve provides means of controlling the flow in the reservoir tube 10 by opening and closing. The valve is preferably a variable-flow pinch valve, with the relevant tube section at the valve being flexible. This arrangement has the advantage of the valve not being in direct contact with the liquid and the system thus being easy to sterilize and maintain. Also, preferably the valve 3 is controlled by a stepper motor or any actuation system which can gradually open/close the valve 3 in fine steps. This stepper motor is controlled by the remote control signals generated from the control unit 314 such as an electronic board or microcontrollers.

The reservoir tank 302 comprises means for maintaining a higher liquid pressure or head in relation to the liquid pressure at liquid outlet 8, means of providing liquid for outward flow. The reservoir tank 302 preferably comprises a relatively large liquid container with surface area of the liquid in the liquid container being many times larger than the cross-sectional surface area of the reservoir tube 10, and in one embodiment the reservoir tank 302 being open to atmospheric pressure (FIG. 3A) containing liquid having a surface level higher relative to the liquid outlet 3 such that the hydrostatic pressure is sufficient to provide liquid flow in the flow channels from the reservoir tank 302 to liquid outlet 8 when the flow direction means are set accordingly. When the flow is directed to the reservoir tank 302, the liquid may be accommodated with the result that the liquid level will rise, but will rise only slightly because of the large surface area of the liquid in the reservoir tank 302, and therefore, the hydrostatic pressure head will change, but will change only slightly. There is also separate a liquid overflow outlet to maintain a constant water level (liquid pressure head) in the tank. When the flow is directed from the reservoir tank 302 into the reservoir tube 10, liquid may be dispensed with the result that the liquid level will drop in the reservoir tank 302 but will drop only slightly. The required liquid flow and pressure head is provided by using a pump, such as a peristaltic pump to generate the required pressure.

Alternatively, the reservoir tank 302 is full of liquid and slightly above atmospheric pressure (a) with reservoir tube 10 at the bottom with flow direction means 7 in the direction of gravity for particles denser than the liquid, or (b) with reservoir tube 10 at the top with flow direction means 7 opposite to the direction of gravity for particles lighter than the liquid, or (c) with two reservoir tubes 10 one at the bottom and one at the top with flow direction means 7 in the direction of gravity and opposing to the direction of gravity, respectively for inhomogeneous particles some denser and some lighter than the liquid. Without loss of generality, the invention described below can be applied to all three cases (a, b and c) outlined here.

In order to follow the movement of the particles in the flow channels, the apparatus comprises of several detectors. A reservoir tube detector 4 is placed in the reservoir tube 10 in order to determine the local concentration and velocity of particles passing though the scan region 5. The reservoir tube detector 4 should be placed closer to the intersection 11 wherein it can detect particles travelling in the scan region 5. The reservoir tube detector 4 may comprise of any one or a combination of any sensor, optical or otherwise, or a machine vision system, or an image analysis system, or any other means of determining the local concentration and velocity of particles.

The reservoir tube detector 4 comprises an optical imaging means and image analysis means. The optical imaging means may comprise a digital camera and light source such as a flash. The reservoir tube detector 4 has computational and storage capabilities, and can be provided as one physical unit. The image analysis means may be implemented in a unit that is physically the same as the control unit 314 or in a physically separate unit. The image analysis means may be implemented by means of a computer program, as outlined in a separate section below.

The particle detectors 6, 205, and 206 may comprise a laser-based optical sensor for detecting fast moving object(s) in the detection line of the sensor.

The particle detector 207 may comprise a photo sensor for detecting stationary object(s) in the detection line of the sensor. Photo sensors for use with the invention may be in principle any of the many photo sensors known in the art suitable for the purpose.

The flow channels need to be sufficiently transparent for the wavelengths utilized by the photo sensors or imaging means used, at least at the locations where these devices are placed. This may be achieved for example by manufacturing the flow channels of a transparent material such as glass, or by placing windows in the flow channels at desired locations. Preferably, the imaging surface should be flat and smooth.

The reservoir tube detector 4 continuously monitors the particles in the scan region 5 such that: (1) two successive images are captured in a predefined time interval by means of a high speed camera which is part of the reservoir tube detector 4; (2) then the number of particles in the scan region 5 is determined by means of the image analysis techniques; and (3) after performing the above task (2), if the reservoir tube detector 4 had detected any particle(s) then the velocity of the particle(s) is determined by means of the image analysis techniques.

The apparatus comprises a control unit 314 for steering the flow of the liquid in the flow channels 7. When no particle is detected by the reservoir tube detector 4, the flow direction means 7 is controlled such that the flow is directed from the reservoir tank 302 to the outlet tube 9. When one or more particles are detected by the reservoir tube detector 4 and if the number of particles are more than the maximum allowed number of particles in the scan region 5, then the flow direction means 7 is directed from the intersection 11 to the reservoir tank 302 by opening the pinch valve 3, so the particles can be moved upward with this liquid flow in the reservoir tube 10. This is done by opening the pinch valve 3 by one notch. When one or more particles are detected by the reservoir tube detector 4 and if the number of particles are less than the maximum allowed number of particles in the scan region 5, then the velocity of the particle(s) is determined and a new control parameter (CP) is calculated by multiplying the local concentration of particles and the velocity of the particles. If the CP is within the minimum and maximum values allowed by the control program, then no change is done to the direction means 7. If the CP is higher than the maximum value allowed by the control program, then the pinch valve 3 is opened by one notch to change the flow direction means 7 to direct the flow from the intersection 11 to the reservoir tank 302 so the particles can be slowed down or moved upward with this liquid flow in the reservoir tube 10. If the CP is lower than the minimum value allowed by the control program, then the pinch valve 3 is closed by one notch to reduce the upward flow in the reservoir tube 10 or change the flow direction means 7 from reservoir tank 302 to the outlet tube 9.

In parallel to the above steps, the particle detector 6 is monitoring particles released into the outlet tube 9. If a particle is detected by the particle detector 6 then it sends a remote signal to the control unit 314 which opens the pinch valve 3 to change the direction means 7 to upward flow in order to prevent the next particle from coming into the outlet tube 9 before the predefined time interval. This predefined time interval between adjacent particles is necessary to properly separate the particles and provide adequate regulation (or regular distance spacing) between the particles for the downstream processes. This process is executed promptly without executing the above steps only if a particle was detected by the particle detector 6.

The above mentioned steps/operations are repeated continuously during the automated regulation process, so the particles going out of the liquid outlet 8 have adequate separation between them for downstream processes or devices.

In order to calculate the control parameter (CP), the number of particles traveling per second ($\phi_N$) and velocity ($V_E$) of those particles needs to be determined. This can be given by $\phi_N = C_N \times V_E$, where $C_N$=local concentration of particles=number of particles per unit volume.

An image cross-correlation technique is used for calculating the displacement (and hence velocity) of the particles travelling in the reservoir tube 10. This technique is disclosed in Aidun et al., TAPPI JOURNAL, 84(3) (2001), 'Forming Jet Surface Velocity Profile Measurements with High Speed Digital Imaging'. The displacement of the surface topographic pattern is calculated based upon cross-correlation of two successive images which were captured at very short time interval. In order to reduce noise and improve signal-to-noise ratio (SNR), a threshold intensity level is set, and every point below this intensity is considered as zero intensity.

When regulated particles from the liquid outlet 9 are fed into downstream devices for further processing, there could be possible choke points for the particles where a larger diameter tube transitions into a smaller diameter tube 209*a* or a smaller inside diameter tube (relative to the size of the particles) transitions into a sharper bend 209*b*.

Sometimes particles can get clogged in these choke points 209*a* and 209*b*, which partially or completely restrict the liquid flow and obstruct any particles going into the downstream flow channels. Therefore, it is very important to remove these plugs out of the flow channel immediately, so upstream and downstream processes/devices can operate without any disruption.

An automated plug removal device (FIG. 2) is designed for removing particles which get stuck in possible choke points. This device has a liquid inlet 200 where particles enter into the device. The first part (shaded region) of the inlet tube comprises of a flexible rubber tubing which goes through the normally open inlet valve 202 and connects into a glass tube. The latter part of the outlet tube 204 is flexible rubber and goes through the normally closed outlet valve 203 and is connected to a suction line. These inlet and outlet valves 202 and 203 comprise of solenoid pinch valves which are be operated/activated by remote electric signals from the control unit 314. Under normal operation when there is no clogging in the main flow channel the inlet valve 202 is open and the outlet valve 203 is closed.

The control unit continuously gets feedback from the particle detectors 205, 206, and 207 to determine whether there is a plug in the flow channel. If a plug occurrence is detected then the control unit sends remote signals to close the inlet valve 202 and open the outlet valve 203. This would cut off the liquid flow and particles coming into the liquid inlet 200, and suck out left over liquid in the particle processing tube 208 through the outlet tube 204, so any particle stuck at 209*a* is removed with the liquid.

There are two techniques being used for plug detection. For choke points similar to 209*a*, a particle detector 207, which can detect any stationary objects present, is continuously monitoring for any plugs at 209*a*. When the particle detector 207 detects a plug (any object stuck in the choke point), it will immediately activate the plug removal mechanism. For choke points similar to 209*b* or at any other unexpected location in the flow channel 208, the particle detector 205 at the beginning position of the particle processing tube 208 detects any object entering into the flow channel 208 and the particle detector 206 detects any object exiting from the flow channel 208. Under normal operation if the liquid flow rate is constant then the time of travel of an object traveling from 205 to 206 should be the same for each particle within an accepted tolerance. If there is any obstruction in the flow channel 208 due to a plug then the time of travel is larger than the nominal value. Therefore, if the particle detector 206 does not detect a particle during the nominal time of travel after that particle was detected by the particle detector 205, the plug removal is activated for a predefined time.

When the plug removal device is activated the inlet valve 202 is closed to stop any more particles coming into the particle processing tube 208 and the outlet valve is opened 203. The outlet tube 204 is connected to a vacuum line to suck out all the left over liquid along with any particles jammed in the particle processing tube 208.

The control unit 314 has computational and storage capabilities, and can be provided as one physical unit, or alternatively as a plurality of logically interconnected in many ways. For instance, the control unit could be an ordinary commercially available personal computer or a specifically tailored microprocessor-controlled control unit.

Means of controlling other units and receiving input from other units such as optical sensors can be implemented in many ways, wired and wireless. For instance, the control unit 314 may comprise a digital/analogue converter input-output unit capable of producing analogue electric signals that can be transmitted through wired signals. Alternatively, the signals could be wireless through acoustic, optical, infrared or radiofrequency signals. For example, the Bluetooth or wireless LAN technologies could be used to transmit the signals from the control unit 314 to the components to be controlled.

It should be noted that the control unit 314 comprises logic for performing the functionality of the regulator device as explained in the above sections. This functionality may be implemented by means of a software or computer program. The control unit may also comprise storage means or a memory unit for storing the computer program and processing means or a processing unit, such as a microprocessor, for executing the computer program. The storage means may also be readable storage medium separated from, but connected to the control unit 314. When, in the above, it is described that the regulator device performs a certain function it is to be understood that the control unit 314 in the regulator device uses the processing means to execute a certain part of the program which is stored in the storage means.

This functionality of the control unit 314 may be implemented by means of a software or computer program. When the regulator apparatus performs a certain function, it is to be understood that the control unit 314 in the regulator and plug removal apparatus uses the processing means to execute a certain part of the program which is stored in the storage means. The invention relates also to a computer program which, when run in a control unit 314, causes the control unit 314 to perform the actions described above in response to the inputs described above.

Preferably, the same physical unit that provides the control unit 314 functionality also provides the image analysis functionality as this allows for a simpler construction and requires less communication between physical units.

A sample of a combined system for particle processing with regulation and plug removal invention is shown in FIG. 3A and FIG. 3B. In the case of FIG. 3A, the reservoir tank 302 is retrofitted with a motor 303 and drum 307 for rotating the fluid. However, the motor and drum features of the reservoir tank are not necessary for this invention. Any other reservoir tank with one reservoir tube 10 at the bottom (for denser particles), or the top (for lighter particles) or both bottom and top (for inhomogeneous mixture of lighter and denser particles) such as in FIG. 3B can be used with this invention.

Multiple automated regulator devices can be connected in parallel to the same reservoir tank 302 to take advantage of the high throughput from the reservoir tank and also to improve the efficiency of the downstream processes. The main reservoir tube 10 connected to the bottom of the reservoir tank is split into multiple channels and fed each channel into an automated regulator device (FIG. 1) which operates independently. Moreover, the scan regions of these regulator devices can be grouped together. For instance, same reservoir tube detector 4 can be shared among two or more regulator units with split scan regions.

In another embodiment of the invention shown in FIG. 3B, the reservoir tank 302 has reservoir tubes 10 at bottom and top each with flow direction means 7 opposite to the other. The top reservoir tubes 10 has a flow direction means opposite to the direction of gravity allowing capture of particles that are lighter than liquid and rise. The bottom reservoir tubes 10 has a flow direction means in the direction of gravity allowing capture of particles that are heavier than liquid and sink. Both of the reservoir tubes are connected to the regulator device shown in FIG. 1 at the bottom 300 and at the top 316. Multiple liquid outlet tubes 306 are connected to the particle receiving container 305 at the inlet side and connected to the inlet tube 201 of the plug removal devices 315 all in parallel.

The advantages of the method and the devices disclosed herein include: (1) not requiring moving parts, and therefore being robust, (2) being naturally applicable to a continuous flow system thereby not requiring operation in batch mode, (3) being gentle to the particles, (4) being fast since the regulation using the device requires much less than a second to send a particle, (5) the timing and spacing between particles can be adjusted depending on the requirement for the downstream processes, (6) the device being compact and completely enclosed allows easy sterilization, (7) easy online removal of any plugs created by the particles being processed of debris in the liquid without need to stop the system, (8) fast processing of a large number of particles, and (9) increased rate of particle processing by having multiple parallel particle processing tubes 208 that can deposit particles in parallel on the desired substrate or collection tray.

Examples

The automated regulator 300 and the plug removal 315 apparatus were setup as shown in FIG. 3A. The reservoir tank 302 is mounted on a rigid framework 313. The apparatus was tested with flex seeds and plant embryos suspended in water. A reservoir tank 302 was setup from which the particles (flex seeds and plant embryos) were fed through a liquid inlet tube 301 into the reservoir tank 302. A plastic drum 307 is spun by an electric motor 303 in order to rotate the liquid inside the reservoir tank 302 and to keep the particles centered and down into the bottom surface. The electric motor is firmly mounted onto a rigid rod 304 to reduce any vibrations. There is an air vent tube 311 providing filtered air to keep the pressure inside the reservoir tank 302 at atmospheric pressure. This reservoir tank also acts as a separator device for embryos and its operation is disclosed in the patent PCT/US09/39982. There was no regulation mechanism to properly regulate the embryos coming out of the "Separator Device." Therefore, the device presented in here is designed to regulate the particles such as embryos coming out of the "Separator Device" and send individual particles (spaced out properly) to the "Deposition Device." It is important to space out the particles and control the feed rate for the "Deposition Device" to improve the overall efficiency of the whole system.

The flow loop was constructed from a mixture of glass and silicone rubber tubing. A peristaltic pump continuously drew water from a large reservoir and into a pressurized vessel filled with air and water. This pressurized vessel served to dampen the pulsations associated with the peristaltic pump. This is a standard method to dampen the pulsation from a pump. One of the liquid outlets from the pressurized vessel is used to load particles into the reservoir tank 302 through the liquid inlet tube 301. Another liquid outlet from the pressurized vessel is connected to the liquid inlet tube 309 which served as the high-pressure water inlet line for the operation of the regulator device 300. The screw type pinch valve 308 is steered by an electric stepper motor 310 which gets the control signals from the control unit 314.

The liquid outlet 8 is connected to a particle receiving container 305 which is made out of glass. This particle receiving container 305 is used to provide a constant flow rate for the downstream flow channel 306 by maintaining a constant liquid pressure head ($h_2$). The constant pressure head ($h_2$) is achieved by maintaining the liquid level inside the particle receiver 305 at a constant level. Because the liquid overflow outlet 312 drains the excess water coming into the vessel from the regulator device 300. Also, the liquid pressure head ($h_1$) is kept constant throughout the operation. The particle receiving container 305 is positioned above the intersection 11 of the reservoir tube 10 and the outlet tube 9 at a height where the height of the fluid in the reservoir tank 302 and the height of the liquid in the particle receiving container 305 is adjusted such as to balance the hydrodynamic pressure at the intersection 11 for proper operation of the regulator. If the particle receiving container 305 is below the intersection 11, such regulation will not be possible.

Initially the rubber tube connected to the pinch valve 3 was pinched off almost completely, so liquid flow through the reservoir tube 10 was downward. The stepper motor 310 used here is a general purpose electric motor connected to the computer. The pinch valve 308 is custom made screw type valve to pinch off the inlet rubber tube 2. This allowed particles (flex seeds and plant embryos) to travel down towards the reservoir tube 10. The wider side of this rectangular tube is facing the reservoir tube detector 4. The rectangular cross-section is important to disperse the particles in the vertical plane and reduce any bright reflection spots created by the illumination source of the reservoir tube detector 4. When the particles are dispersed in the vertical plane, it is easier for the reservoir tube detector 4 and the control unit 314 to more accurately determine the number of particles in the scan region 5.

The reservoir tube detector 4 comprises a Prosilica GC 1290 camera and an external LED flash unit. The camera is mounted perpendicular to the imaging surface. The camera is connected to the computer LAN port via a GigE interface and is software trigged via the same GigE interface. This signal trips the shutter while simultaneously triggering the external flash unit. The camera is placed at least 10 cm away from the reservoir tube 10, but this distance is mainly dependent on the focal length of the camera lens and the required area for the scan region 5. The scan region 5 is chosen to be 25 mm×10 mm along the reservoir tube 10 and closer to the intersection 11.

Before starting the test, a background image of the scan region (without any particles was captured. During the test, the camera is continuously capturing the images at pre-defined short time intervals. The program first initializes the camera, triggers the shutter and flash together and interfaces the captured image to the computer as a 32 bit RGB image file. Then the background of the image was removed by subtracting the previously captured background image, leaving only the difference between the two images. Then the image is converted into a binary gray-scale image file by extracting the intensity plane with respect to a certain intensity threshold value to reduce background noise in the image. The binary file is converted to a matrix representation during the image analysis process to improve the computational speed.

When one or more objects are found in the scan region 5, the image analysis program uses edge detection technique to count the number of objects. If the number of objects is larger than the maximum number of objects allowed in the scan region 5, the control unit 314 sends a remote signal to the stepper motor 310 to open the pinch valve 308 so there will be enough flow going upward in the reservoir tube 10. If the number of objects is less than the maximum allowed objects in the scan region, the image analysis program uses two successive images to calculate the velocity of the objects. Then the program calculates the control parameter (CP) in terms of the local concentration of particles and the velocity. If the control parameter is within the allowed range, the control unit does not do anything. However, there is another parallel program running in the computer to get a feedback signal from the particle detector 6 which is a laser-based optical sensor installed above the outlet glass tube 9 and closer to the intersection 11. This sensor was set in the light-operate mode such that it outputs an analog electrical signal of 10 Volt when the optical path is clear and 0 Volt when an object breaks the laser beam. It was connected to the computer via an analog to digital converter electronic circuit. If the program gets a signal from this particle detector 6, the program checks the interval between the previously detected particle and the current particle. This time interval is very important to space out the particles properly by releasing the particles into the outlet tube 9 at regular time intervals. If the calculated time interval is less than the allowed value needed for separation, the program discards the other operations and immediately sends a remote signal to the stepper motor to open the pinch valve. This would prevent a second particle coming into the outlet tube 9 before the allowed time interval.

If the control parameter (CP) is larger than the maximum value, the pinch valve 3 is open to change the direction of the flow in the reservoir tube 10 and hence slow down the objects travelling downwards. If the control parameter is smaller than the minimum value, the pinch valve 3 is closed to reduce the upward flow in the reservoir tube 10 and hence speed up the objects travelling downwards.

The particles exiting from the liquid outlet tube 306 are fed into a similar "Deposition Device" disclosed in the patent US 2011/0153093 A1 which is now retrofitted with the plug removal device 315 disclosed in this invention. When there is a relatively larger particle than the diameter of the particle processing tube 208, there is a very high possibility that the particle may get stuck at the choke point 209a. The inlet 202 and outlet 203 valves are comprised of general purpose solenoid pinch valves which can be used to controllably and selectively close the part of the flow path to which the flow is not to be directed with the relevant tube sections at the valves being flexible. The advantage of this arrangement is that the liquid does not make direct contact with the valve so the system can be easy to sterilize and maintain.

Therefore, when a relatively larger particle gets jammed in the choke point 209a, the particle detector 207 sends a remote signal to the control unit to activate the plug removal mechanism and temporarily stop the regulation process. When the plug removal device is activated 315, the inlet valve 202 is closed to stop any more particles coming into the particle processing tube 208 and the outlet valve 203 is open. The outlet tube 204 is connected to a vacuum bottle to suck out all the left over water along with any particles stuck in the particle processing tube 208.

Sometimes the particles can rotate in the particle processing tube 208 while it is travelling. This may cause the particle to get jammed anywhere in the particle processing tube 208. In order to detect these kind of plugs, two particle detectors are installed: a first detector at the beginning 205 and a second detector at the end 206 of the particle processing tube 208. These sensors were set in the light-operate mode such that it outputs an analog electrical signal when an object breaks the laser beam. They were connected to the computer via an analog to digital converter electronic circuit. The control program running in the computer starts to count the elapsed time after a particle passed through the first detector 205. If the program does not get a signal from the second detector 206 before the allowed elapsed time then the program activates the plug removal mechanism to remove any particles jammed in the flow channel.

Moreover, the particle detector 6 on the regulator device 300 or 316 can be used as the first particle detector for the plug removal device 315. This will reduce the number of particle detectors needed for the whole system, and also increase the length of the flow channel that is being monitored for any plugs.

Computing and control unit tasks were handled with an Intel multi-core processor. Instrument interfacing was done through a LAN port (GigE protocol for the camera) and a National Instruments USB data acquisition input/output card (for the sensors, stepper motor, camera flash trigger). The program is coded in LabVIEW environment with the IMAQ and NI Vision extensions from National Instruments. Parts of the program (especially the matrix manipulation) is converted to C++ to increase the calculation speed. This invention is independent of the software application and can be programmed in various programming languages.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A system for automatically regulating particles suspended in a liquid, the system comprising:
   at least one regulating device for automatically regulating particles suspended in a liquid, the regulating device comprising:
      an inlet tube having a first inlet tube end and a second inlet tube end opposite and spaced apart from the first inlet tube end;
      a reservoir tube having a first reservoir tube end and a second reservoir tube end opposite and spaced apart from the first reservoir tube end, wherein the second reservoir tube end is coupled to and in fluid communication with the second inlet tube end;
      an outlet tube having a first outlet tube end and a second outlet tube end opposite and spaced apart from the first outlet tube end, wherein the first outlet tube end is coupled to and in fluid communication with the second inlet tube end and the second reservoir tube end;
      at least one sensor for detecting particles suspended in the liquid, wherein a first sensor is configured to detect particles within a portion of the reservoir tube; and
      a valve configured to regulate the flow of liquid through the inlet tube;
   a reservoir tank having a first end and a second end opposite and spaced apart from the first end, wherein the first end is in fluid communication with atmospheric pressure and the first reservoir tube end is in fluid communication with either the first end of the reservoir tank or the second end of the reservoir tank;
   a high pressure water source in fluid communication with the first inlet tube end; and
   a controller, wherein the controller is in operable communication with the first sensor and the valve, wherein the controller executes non-transitory computer-readable instructions that cause the controller to:
   receive first sensor data from the first sensor, wherein the first sensor data corresponds to the concentration and velocity of particles within a portion of the reservoir tube;
   compare the first sensor data to a maximum value, wherein the maximum value is predetermined to provide a desired local concentration and velocity of particles within the portion of the reservoir tube; and
   cause the valve to open in response to the first sensor data being greater than the maximum value, or
   cause the valve to close in response to the first sensor data being less than the maximum value.

2. The system of claim 1, wherein the first reservoir tube end is in fluid communication with the first end of the reservoir tank or the second end of the reservoir tank.

3. The system of claim 1, further comprising a particle receiving chamber in fluid communication with the second outlet tube end, the particle receiving chamber defining a liquid overflow outlet configured to maintain a predetermined liquid pressure head within the particle receiving chamber.

4. The system of claim 1, wherein the at least one regulating device comprises two or more regulating devices, wherein the first reservoir tube end of each of the two or more regulating devices is in fluid communication with the reservoir tank.

5. The system of claim 4, wherein each of the two or more regulating devices operates independently of the other regulating devices.

6. The system of claim 1, wherein the at least one regulating device comprises a first regulating device, the system further comprising at least one second regulating device and a second reservoir tank, wherein the first end of the second reservoir tank is in fluid communication with the first reservoir tube end of the second regulating device.

7. The system of claim 1, wherein the first sensor comprises an optical imager.

8. The system of claim 1, wherein the valve comprises a variable-flow pinch valve.

9. The system of claim 1, wherein the at least one sensor further includes a second sensor configured to detect particles within a portion of the outlet tube.

10. The system of claim 9, wherein the second sensor comprises a laser-based optical sensor.

11. The system of claim 1, further comprising at least one plug removal device for automatically removing plugs in a liquid, the plug removal device comprising:

an inlet tube having a first inlet tube end and a second inlet tube end opposite and spaced apart from the first inlet tube end;

an outlet tube having a first outlet tube end and a second outlet tube end opposite and spaced apart from the first outlet tube end, wherein the second outlet tube end is coupled to and in fluid communication with the second inlet tube end;

a particle processing tube having a first particle processing tube end and a second particle processing tube end opposite and spaced apart from the first particle processing tube end, wherein the first particle processing tube end is coupled to and in fluid communication with the second inlet tube end and the second outlet tube end;

at least one sensor for detecting particles suspended in the liquid, wherein a first sensor is configured to detect particles within a portion of the particle processing tube;

a first valve configured to regulate the flow of liquid through the inlet tube; and a second valve configured to regulate the flow of liquid through the outlet tube, wherein the first inlet tube end of the plug removal device is in fluid communication with the outlet tube of the at least one regulating device.

12. The system of claim 11, wherein the at least one plug removal device comprises two or more plug removal devices, wherein the inlet tube of each of the two or more plug removal devices is in fluidic communication with a particle receiving chamber in fluid communication with the second outlet tube end of the regulating device.

* * * * *